Oct. 23, 1956   W. F. COUSINO   2,767,951
SHELF LOCK
Filed Nov. 6, 1953

INVENTOR
Walter F. Cousino
BY Evans & McCoy
ATTORNEYS

United States Patent Office 2,767,951
Patented Oct. 23, 1956

2,767,951

SHELF LOCK

Walter F. Cousino, Toledo, Ohio, assignor to Ex Corporation, Toledo, Ohio, a corporation of Ohio Application November 6, 1953, Serial No. 390,635

1 Claim. (Cl. 248—245)

This invention relates to a fitting for securing cross bars to slotted channel members such as used in adjustable shelving, display racks, stock bins and the like to a method of making the same.

The shelves are bolted to metal shelving in which the spaces between shelves are adjustable in small increments and is widely used in manufacturing establishments for storing heavy dies and machinery parts. To prevent slipping of the shelves under the weight of heavy loads, channel members of square or rectangular cross-section having a longitudinal slot and having teeth rolled or cut into the metal adjacent the inner edges of the slot are used as the upright supports. The bolts or nuts used for bolting the shelves to the channel members have projections suitable for interlocking with the teeth of the channel.

Inasmuch as the upright channel members have a relatively narrow slot therein with re-entrant or over-hanging inturned edges it has been difficult to maintain the nut in proper position to receive the bolt when the shelves are assembled or moved. Hence, it has usually been customary to utilize a bolt with a toothed head and with head in the channel and the threaded portion or stud projecting. This arrangement had the advantage of providing a protruding handle to move the toothed portion in the channel. It thus would seem to facilitate movement of the fastening components to position. Assembly of shelf and nut is still difficult however, unless the length of the studs is much longer than otherwise necessary and in such cases the projecting stud is disadvantageous as it catches on clothing and the like and is likely to cause severe injury.

In order to facilitate assembly of the shelving and to provide safety, the nut of the shelf fastener should be inside the channel. It should be movable longitudinally and should stay in position where placed. It should have strong teeth for interlocking with teeth on the channel and when it is slid from place to place always be in a position to receive the bolt and should not be able to turn with the bolt.

It has been proposed to provide the nuts with a conventional coil spring to hold them in position against the walls of the channel slot while the shelf is being adjusted and tightened. In practice, it has been found that a coil spring is not satisfactory in that they come loose from the nut or bend away from the nut when the nut is moved so that the nut tips sideways so that it falls in the channel and can not receive the bolt. Likewise, spiral leaf springs such as are used on a common mouse trap would seem advisable but it has been found very difficult to attach the spring to the nut. To be of commercial value, the nut should be readily cold formed or coinable. Means of attaching such springs to the nuts heretofore proposed require the forming of pins or shaft-like projections on the under face of the nut to receive the coiled portion of the springs. Such fastening elements are difficult to cold form or machine. In addition, they set up spring forces at the attachment and tend to break and give uneven spring pressure. This makes the spring give at uneven pressures so that it does not slide easily along the back of the channel member.

It is an object of the present invention to provide an assembly which is readily manufactured, and which firmly holds the cross-bars, which is readily adjusted, and which is durable and long lasting.

It is another object of the present invention to provide a nut slidable along the slot of a channel which has teeth or projections for interfitting with teeth of said channel which nut is spring held to retain any position along the said slot and can be easily manufactured.

Other objects and advantages will be apparent from the drawings in which like numerals relate to like parts.

Figure 1:
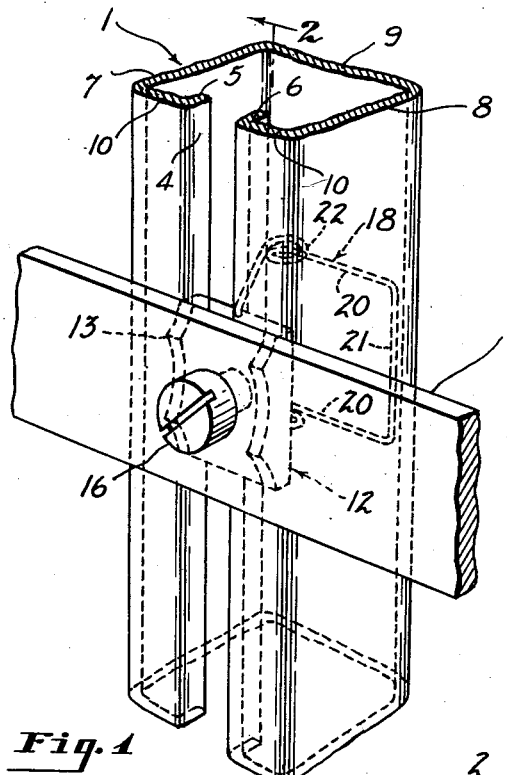
Figure 1 is a perspective view of a crossbar secured to channel by means of a fitting constructed in accordance with this invention.

In accordance with this invention, the vertical channel frame 1 is secured to a crossbar or horizontal frame 2 by means of a fitting. The channel is provided with a slot 4 formed between re-entrant slot portions or walls 5 and 6 which are parallel to channel side walls 7 and 8 and protrude into the channel generally perpendicular to the plane of the slot to serve as a guide rack for the nut as hereafter described. The channel back wall 9 faces the slot front wall 10. The side walls 7 and 8 of the channel are spaced from each other a distance substantially greater than the width of the slot 4 plus slot walls 5 and 6 to provide a space for a row of teeth 11 formed in the channel as by rolling adjacent each wall 5 and 6.

The fitting of the present invention comprises a generally channel shaped nut 12 provided with a back portion 28 and flange side portions 14 spaced from each other sufficiently to overlay the slot 4 and the walls 5 and 6. Teeth 13 on both sides of the face thereof extend beyond the plane of the nut and adapted to fit with the inner teeth 11 of the channel. The teeth are generally formed on flange portions 14 at both sides of the nut and are directed perpendicularly from the plane of the nut face. The teeth are widely spaced and few in number in order to have much resistance to shear. Only two teeth are preferred on each of said flange portions. The nut is provided with a central threaded hole 15 into which bolt 16 is threaded. Short holes or openings 17 are drilled in opposite sides of the nut preferably vertical to receive spring 18.

Figure 2:
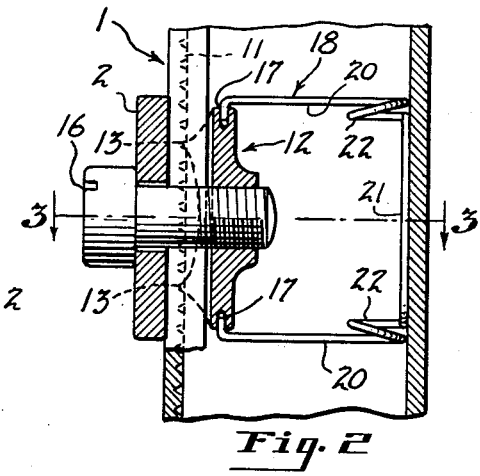
Fig. 2 is a side cross-sectional view taken along line 2—2 of Fig. 1 showing the assembly of this invention.
Figure 3:
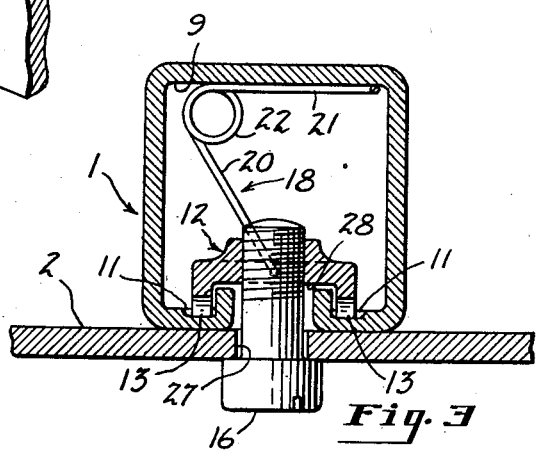
Fig. 3 is a vertical cross-sectional view taken along line 3—3 of Fig. 2 showing the assembly of this invention.
Figure 4:
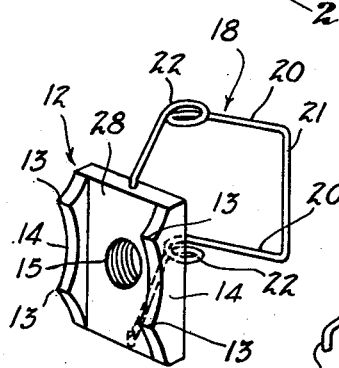
Fig. 4 is a perspective view of the nut of this invention assembled with a spring.

The spring 18 is provided with bent-over end portions 19 which fit into vertical holes or openings 17 in the nut adapted to receive the end portions 19. The spring is thus arranged to pivot on an axis, preferably a vertical axis. The spring has a pair of preferably horizontal arm portions 20 extending substantially from the bent-over end portions 19 joining a portion 21 which is generally U-shaped when viewed in the vertical plane as shown in Fig. 2. The spring comprising the arms 20 and portion 21 is generally L-shaped or has a dog leg shape when viewed in the horizontal plane as shown in Fig. 3. The portion 21 rests and bears against the back channel wall 9. Spring forces are provided by pressing the U-shaped portion 21 against the nut to collapse the dog leg. At the juncture of the U-shaped portion 21 and arm portions 20, a coil 22 is preferably provided.

Figure 5:
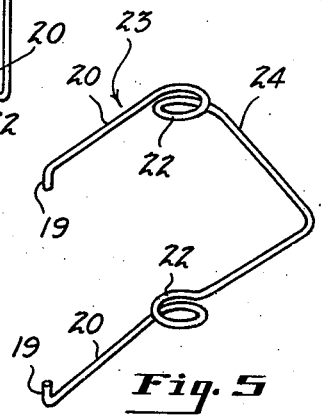
Fig. 5 is a modified form of spring for use with this invention.
Figure 6:
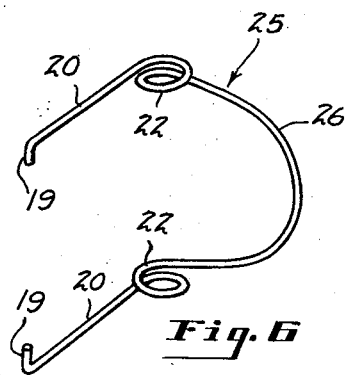
Fig. 6 is a second modified spring for use with this invention.

Figure 5 shows modified spring 23 with a U-shaped portion 24 with a V bend therein and Fig. 6 shows a modified spring 25 with a round, smoothly bent portion 26. The U-shaped portion of spring 18 is square. By the term "U-shaped portion," applicant means any of the square, V, or rounded shapes shown.

The fitting of this invention is assembled as follows: The nut with spring attached is placed inside the channel member and the spring is placed in compression against the rear wall 9 of the channel member. This causes the teeth 13 of the nut to interfit under spring pressure with the row of teeth 11 of the channel member and holds the nut firmly in any position. The nut is moved by pressing it toward the rear channel wall 9 to free it from teeth 11 and then relocating it. Bolt 16 is then placed through bolt receiving hole 27 of the crossbar and threaded into the hole 15 in the nut. The bolt is then screwed into the nut to draw it against the channel portions 10 and the channel is firmly secured to the crossbar.

There are many advantages to this fitting. There is a minimum amount of material projection beyond the face of the crossbar so that there is little chance of catching clothing or banging or bruising people. The nut can be readily positioned in the crossbar and securely held in the portion selected without the least difficulty. The spring member shown readily slides up and down in the crossbar and does not lose its spring-like qualities or tip the nut sideways as does a coil spring. A major advantage is that the spring itself is readily attached to the nut without complicated or expensive attaching arrangement to react with uniform spring pressure. The nut and spring assembly can be made by coining a metal blank to give a cold worked and densified structure which is much stronger than one produced by a metal cutting operation or a casting operation. All spring action is at the dog leg and there is no catching or uneven action at the attachment of the nut.

It is understood that in accordance with the patent statutes, various modifications may be made without departing from the scope of my invention.

Having thus described my invention, what I claim is:

The combination of a channel member, a crossbar, and a fitting to secure the crossbar to the channel member comprising a longitudinally-slotted channel member having reentrant wall portions on each side of said slot and teeth formed on the slotted face of said channel between said wall portions and the sides of said channel, a crossbar provided with a bolt-receiving hole therein, a fitting comprising a generally channel-shaped nut provided with teeth formed in the flanges forming the side walls of the nut and adapted to interfit with the teeth of the channel adjacent the slot, the central portion of the nut defining a threaded bolt-receiving hole and opposite side portions of the nut defining a pair of spring-receiving holes, a spring with bent-over end portions fitting into said spring-receiving holes, said spring having a pair of arm portions integral with a generally U-shaped back portion so that the U-shaped back portion can be placed in compression by advancing it toward the nut, said nut fitting inside said channel portion and being maintained by compression of said spring therein to hold the nut in position inside said channel member, and a bolt fitting through the bolt-receiving hole in the crossbar and threading into the bolt-receiving hole in the nut to draw it tightly against the channel member.

References Cited in the file of this patent

UNITED STATES PATENTS

| | | |
|---|---|---|
| 456,877 | Bingman | July 28, 1891 |
| 569,640 | Hartzell | Oct. 20, 1896 |
| 1,154,847 | De Vore | Sept. 28, 1915 |
| 1,876,865 | Dean | Sept. 13, 1932 |
| 2,345,650 | Attwood | Apr. 4, 1944 |

FOREIGN PATENTS

| | | |
|---|---|---|
| 242,764 | Great Britain | Nov. 19, 1925 |